United States Patent

Oxaal

[19]

[11] Patent Number: 6,118,454
[45] Date of Patent: Sep. 12, 2000

[54] METHODS AND APPARATUSES FOR PRODUCING A SPHERICAL VISUAL DATA SET USING A SPHERICAL MIRROR AND ONE OR MORE CAMERAS WITH LONG LENSES

[76] Inventor: Ford Oxaal, 42 Western Ave., Cohoes, N.Y. 12047

[21] Appl. No.: 08/950,752

[22] Filed: Oct. 15, 1997

Related U.S. Application Data

[60] Provisional application No. 60/028,825, Oct. 16, 1996.

[51] Int. Cl.[7] .................................................... G06T 3/20

[52] U.S. Cl. ........................ 345/427; 345/425; 345/433

[58] Field of Search ................................ 345/427, 425, 345/426

[56] References Cited

U.S. PATENT DOCUMENTS

| | | |
|---|---|---|
| D. 312,263 | 11/1990 | Charles . |
| 4,763,280 | 8/1988 | Robinson et al. ....................... 345/433 |
| 5,684,937 | 11/1997 | Oxaal ...................................... 345/427 |

OTHER PUBLICATIONS

"Super–Wide–Angle Cameras by Image Synthesis", Sugiura (IEEE, vol. 41, No. 2, May 1995, pp. 294–303), May 1995.

J.R. Charles, Portable All–Sky Reflector with "Invisible" Axial Camera Support; 1988 RTMC Proceedings.

D. Slater, A Full Sphere Camera For Point of View and VR Photography.

*Primary Examiner*—Mark R. Powell
*Assistant Examiner*—Kimbinh Nguyen
*Attorney, Agent, or Firm*—Westerlund · Powell, P.C.; Raymond H. J. Powell, Jr.; Robert A. Westerlund

[57] ABSTRACT

An apparatus for generating spherical data sets, includes a spherical mirror disposed at a predetermined view point, a camera including a long lens, focused on the spherical mirror, which camera generates an image data stream; and a processor, which receives said image data stream, and which generates the spherical data sets responsive to the image data stream. According to one aspect of the present invention, the camera includes first and second cameras generating respective first and second image data streams. According to another aspect of the present invention, the spherical mirror, said camera, and the processor define a unitary structure. A method for generating the spherical data sets is also described.

4 Claims, 4 Drawing Sheets

A ⟶ E   Scale is 1.0 a = 0° ............A = 0
b = 45° .........B = sin 22.5°
c = 90° .........C = sin 45°
d = 135° ........D = sin 67.5°
e = 180° .......E = sin 90°

METHODS AND APPARATUSES FOR PRODUCING A SPHERICAL VISUAL DATA SET USING A SPHERICAL MIRROR AND ONE OR MORE CAMERAS WITH LONG LENSES

This application claims the benefit of U.S. Provisional Application No. 60/028,825 filed Oct. 16, 1996.

BACKGROUND OF THE INVENTION

The present invention relates generally to apparatuses for generating spherical data sets. More specifically, the present invention relates to apparatuses employing both a relatively long lens and a spherical mirror. Corresponding methods for generating a spherical data set is also disclosed.

Devices employing spherical data sets for generating a viewable image are known. For example, U.S. application Ser. No. 08/478,839 (allowed; issuing on Nov. 4, 1997) discloses an apparatus and corresponding methods for converting a spherical data set into a single image which contains all visual information. An exemplary application of this apparatus is a heads up display for an aircraft which allows the pilot to view his/her environment from a single viewpoint. This permits the pilot to view sections of the airspace which would normally be obscured by the aircraft. It should be mentioned that Ser. No. 08/478,839, which was invented by the present inventor, is incorporated herein by reference for all purposes. It will be appreciated from the above-identified application that the spherical data set can be developed from a series of planar images, e.g., six images defining a cube. It will be appreciated that the spherical data set generated for use in Apple QuickTime VR image display makes use of multiple images which, while not orthogonal to each other, still require multiple stitching steps to construct the spherical data set. It is desirable to reduce the number of image input devices, since this will decrease the number of images which must be stitched together to form a spherical data set.

It should be mentioned that the problem with generating the spherical data set is exacerbated by the fact that the camera must occupy a fixed point in space and all images are developed by rotating the camera about that fixed point. For example, IPIX Corporation provides displayable spherical images called IPIX. An IPIX is an interactive, spherical image, offering users a complete field of view, from earth to sky, floor to ceiling, horizon to horizon. An IPIX is created from two opposing photographs captured by a fisheye lens. It will be appreciated that the IPIX can only be generated with respect to a single point in space. While this is generally acceptable for advertising and virtual museums, the above mentioned spherical data sets cannot be generated from the middle of, for example, a football field.

What is needed is an apparatus for generating spherical data sets which allows a significant displacement between the camera and the spatial center of the spherical data set, thereby improving the versatility with which spherical data set can be generated. It would be highly desirable in the apparatus where robust. Preferably, the apparatus could be readily repositioned.

SUMMARY OF THE INVENTION

Based on the above and foregoing, it can be appreciated that there presently exists a need in the art for an apparatus for generating spherical data set which overcomes the above-described deficiencies. The present invention was motivated by a desire to overcome the drawbacks and shortcomings of the presently available technology, and thereby fulfill this need in the art.

An object of the present invention is to provide an apparatus for generating a spherical data set. According to one aspect of the present invention, the apparatus permits a relatively wide displacement between the imaging device and the point of view of the image.

Another object of the present invention is to provide a method for generating a spherical data set.

These and other objects, features and advantages according to the present invention are provided by an apparatus for generating spherical data sets, including a spherical mirror disposed a predetermined view point, a camera including a long lens, focused on the spherical mirror; which camera generates a image data stream; and a processor, which receives the image data stream, and which generates the spherical data set responsive to the image data stream. According to one aspect of the present invention, the camera comprises first and second cameras generating respective first and second image data streams. According to another aspect of the present invention, wherein the spherical mirror, the camera, and the processor define a unitary structure.

These and other objects, features and advantages according to the present invention are provided by a method of generating spherical data sets for a device having a spherical mirror disposed a predetermined view point, a camera including a long lens, focused on the spherical mirror; which camera generates a image data stream; and a processor, which receives the image data stream, and which generates the spherical data set responsive to the image data stream, the method comprising the steps of:

determining a next (X,Y) rectangular coordinates of a point in the output image buffer;

determining (PSI, THETA) coordinates of the visible sphere from the (X, Y) coordinates;

calling a map function to determine the (r, theta) coordinates of the input image;

converting the (r, theta) coordinates to the (x, y) coordinates of the buffer storing the input image;

coloring the output image the same color as the (x,y) coordinates of the input image; and repeating all previously recited steps until all points in the output image space have been visited.

These and other objects, features and advantages of the invention are disclosed in or will be apparent from the following description of preferred embodiments.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

Before proceeding with a detailed discussion of the preferred embodiments according to the present invention, the terminology used throughout the application will first be introduced. Then, a brief discussion of the underlying principles upon which the present invention is based will be provided. Following that discussion, the preferred embodiments, including exemplary apparatuses and corresponding methods will be described in detail.

The terminology which will be used throughout the applications is as follows:

Spherical mirror—a sphere, or portion thereof, with a mirrored outside surface;

Visible sphere—that which is visible from a given viewpoint in space—one point for each direction from that given viewpoint;

Long lens—also known as telephoto lens—a lens with the ability to resolve small portions of the visible sphere;

Viewpoint smearing—the fact that reflection in a spherical mirror represents not that which is visible from the center of that sphere, but from a viewpoint that is "smeared" over portions of the surface of the spherical mirror;

Viewpoint smearing distortion—the distortion resulting in the reflection of a spherical mirror due to viewpoint smearing; and Layered viewpoint smearing distortion—viewpoint smearing distortion is present when a single camera looks at a reflective sphere, but layered viewpoint smearing distortion is present when two or more cameras view the reflective sphere from different viewpoints. Each time an additional camera looks at the reflective sphere, the reflection of a given point of the visible sphere from the center of the reflective sphere as seen by n cameras is seen from n different viewpoints at various points of the reflective sphere. Thus, n layers of viewpoint smearing distortion are present with the use of n cameras.

From a predetermined viewpoint, a less than hemispherical portion of a spherical mirror is visible. As the viewpoint moves further away from the spherical mirror, that portion of the mirror that is visible, i.e., the visible portion of the spherical mirror, approaches a hemispherical portion. Simultaneously, as the viewpoint moves further from the spherical mirror, the reflections that are visible on the surface of the spherical mirror approximates the entire visible sphere, i.e., each point producing a reflection is visible on the surface of the visible hemispherical portion of the spherical mirror. It should be mentioned that the further the viewpoint is separated from the spherical mirror, the more the mirror approximates a point. Moreover, the further the viewpoint is separated from the spherical mirror, the more the reflection points approach the spherical view available from the center of that sphere enclosing the spherical mirror, in contrast to the points visible though the visible surface of that sphere (less the viewpoint smearing distortion).

Figure 2:
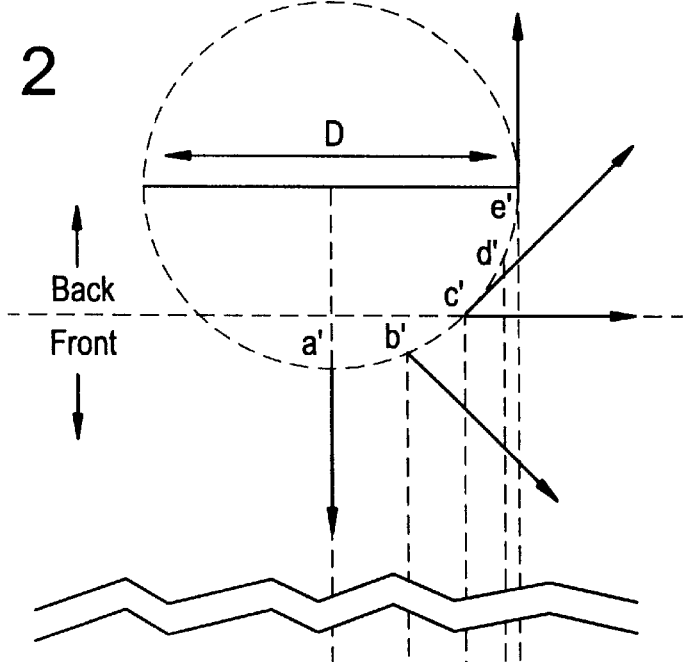
FIGS. 1 and 2 are planar and spherical illustrations, respectively, which are useful in understanding the operation of the present invention.
Figure 1:
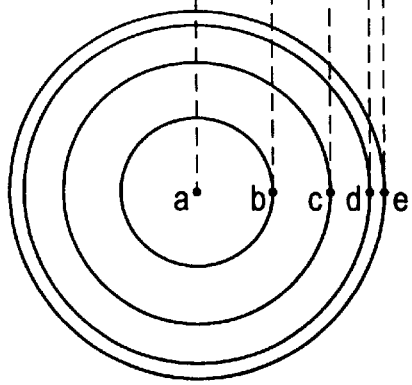
Figure 3:
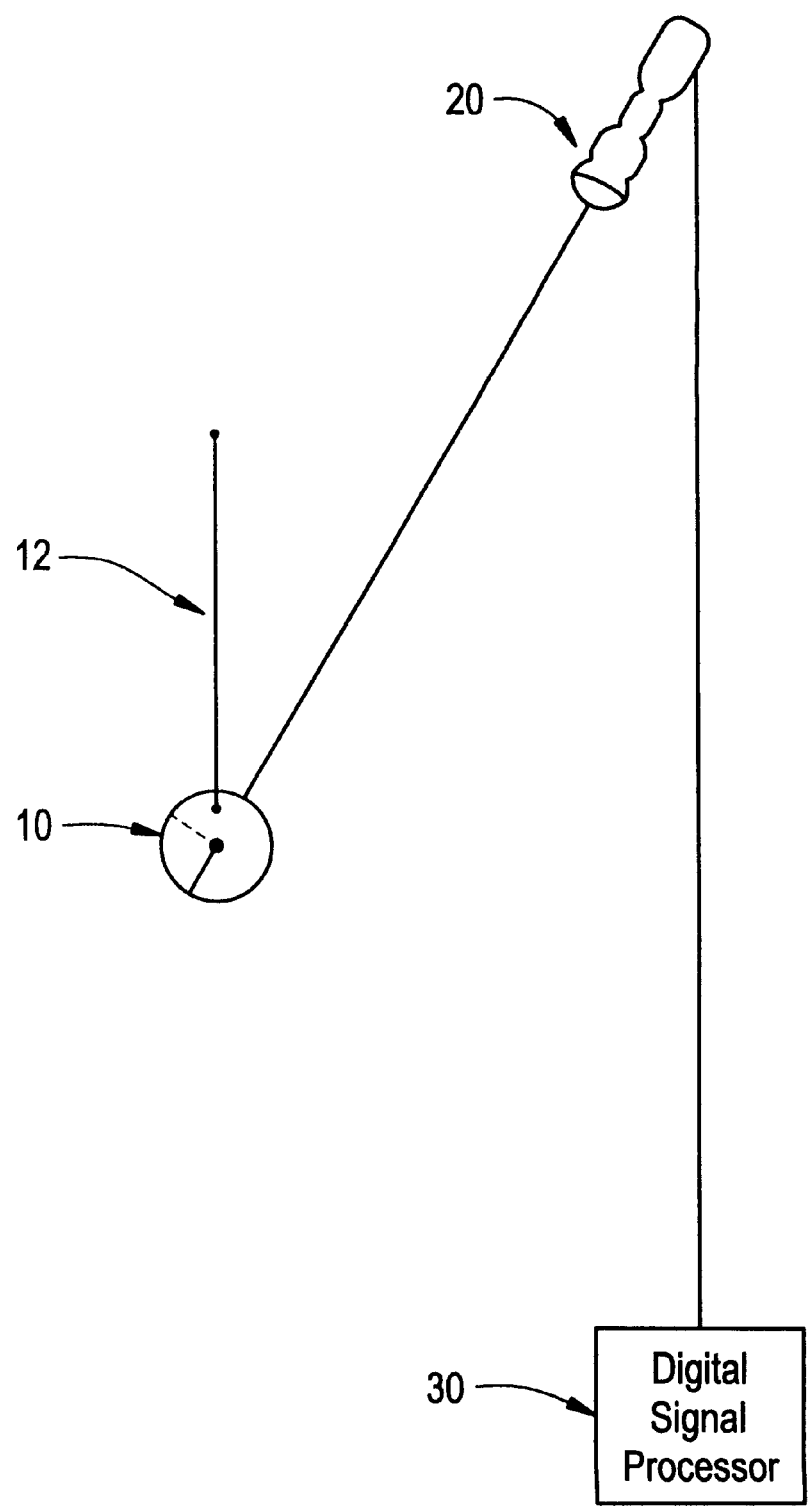
FIG. 3 is a first preferred embodiment according to the present invention.

The geometry of the reflection apparent in a spherical mirror is shown in FIGS. 1 and 2. The circular image seen by a camera (as depicted in FIG. 3, which is discussed in greater detail below) is shown in FIG. 1 for a very powerful long lens, e.g., hundreds of millimeters. Referring to FIGS. 1 and 2, the line connecting e' in FIG. 2 with e in FIG. 2, i.e., the line segment (e',e) approaches being parallel to the line segment (a',a) for long lens camera separated from the spherical mirror by a predetermined distance, as discussed in greater detail below. Points a, b, c, d and e of the image in FIG. 1 correspond to what is visible in the directions drawn from points a', b', c', d' and e' on the surface of the spherical mirror illustrated in FIG. 2. It should be noted that points inside a circle having a radius corresponding to point c advantageously represent all points in the half-space marked "Front" which are visible from the surface of the spherical mirror. Furthermore, points between circles c and e correspond to points in the half-space designated "Back."

It will be appreciated that the camera cannot see the points which are actually obscured behind the spherical mirror. However, it will also noted that this obscured area becomes negligible as the ratio between the length of line segment (a',a) to the length of diameter D of the spherical mirror becomes large. In addition, as this ratio, i.e., 1/D, increases, the reflection of the camera in the spherical mirror becomes negligibly small.

It should also be mentioned that the area in the image between circles through d and e is highly compressed, which makes obtaining the portion of the visible sphere which is reflected in that annular region difficult to obtain and process. However, the solution to the above mentioned problem is to mount another camera, in an exemplary case, on the opposite side of the spherical mirror from the first camera, as discussed in greater detail below.

FIG. 3 illustrates a first exemplary embodiment of the present invention, wherein a camera 20 having a long lens, i.e., a long focal length, is focused on a spherical mirror 10. Advantageously, the spherical mirror 10 is suspended or supported at a single point. In the exemplary case illustrated in FIG. 3, the spherical mirror 10 is suspended from a thin, transparent wire. The output image developed by camera 20 advantageously can be provided to a digital signal processor (DSP) 30. It will be appreciated that the output spherical data set is a digital data set. However, the camera 20 can generate either an analog or digital image, since the DSP 30 can include analog to digital converter (ADC), not shown.

It should be mentioned that the DSP 30 advantageously can be any device capable of transforming a digital data stream into a spherical data set. Thus, the DSP 30 is preferably a dedicated, i.e., single function signal processor. Alternatively, the DSP 30 can be a computer, such a personal computer executing special purpose software.

The apparatus illustrated in FIG. 3 operates as follows. The spherical mirror 10 is mounted in such a way as to minimize the reflection of the mount in the mirror. For example, this can be done by hanging the spherical mirror 20 from a thin, transparent wire. Moreover, the camera 20 is mounted sufficiently far away so as to reduce the size of the camera's reflection in the spherical mirror. This distance preferably is determined by the size of the camera package and the maximum desired size of the camera 20 in the mirror 10. In some cases, the camera 10 may be hidden in the scenery surrounding the spherical mirror 10. In any case, the camera 10 advantageously can be a sufficient distance from the spherical mirror 10 such that the cone formed by the focal point of the camera lens with the tangent lines from that point to the surface of the sphere is a predetermined minimal degree. It should be mentioned that the lens on the camera 20 is sufficiently long so that the majority, e.g., 75 percent, of the field of view of camera 20 is the spherical mirror 10.

For the discussion above, it will be appreciated that what the camera 20 sees is substantially all that is visible from the center of the spherical mirror 10, thus producing a spherical data set. The degree to which every point of the visible sphere is represented increases with the displacement between the camera 20 and the spherical mirror, for all of the reasons discussed above.

It will be noted that once the spherical image is captured by the camera 20, it must be transformed into a spherical data set by digitization. Moreover, the spherical data set can then used in a lookup table for the Minds-Eye-View transformation, whose benefits are outlined in application Ser. No. 08/478,839, which, as discussed above, is incorporated herein for all purposes.

The algorithm for using what the camera "sees" when viewing a reflective sphere as a lookup table is discussed in detail immediately below.

Figure 5:
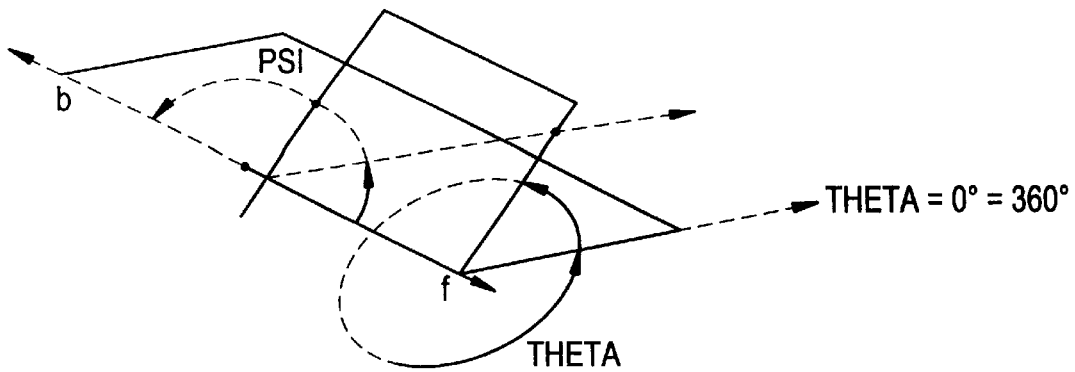
FIGS. 5 and 6 are illustrations which are useful in understanding the methods for generating the spherical data set.

Definitions:

(PS1, THETA) are the coordinates of a point in visible space as shown in FIG. 5. PSI advantageously can vary between 0 and PI, and THETA may vary between 0 and 2*PI.

(r, theta) are the polar coordinates of a circular image of radius 1.0. These polar coordinates may be converted to rectangular coordinates of the buffer containing the circular image by the formulas x=r * cos (theta) * xscale and y=r * sin (theta) * yscale.

Assumptions:

The image produced by the present invention is aligned with the visible sphere such that the THETA of the visible sphere corresponds to the theta of the image.

The image further corresponds to the visible sphere such when r=0, PSI=0. It will be noted that this would be achieved if the line of sight from the camera 20 to the center of the reflective spherical mirror 10 corresponds with the vector f of the visible sphere.

The function for performing the mapping between the coordinates of a point on the visible sphere, and its approximate location within the circular image produced by the present invention:

```
/*declaration*/
void map(double PSI, double THETA, double * r, double * theta);
/* definition */
void map(double PSI, double THETA, double *, double *theta)
{
    *theta = THETA;
    *r = sin(PSI/2.0);
}
```

From the information presented above, it will be appreciated that a scan conversion of an output image can use the map function as follows:

0. Given first (X,Y) rectangular coordinates of a point in the output image buffer, and jump to step 2.

1. Determine the next (X,Y) rectangular coordinates of a point in the output image buffer.

2. Determine (PSI, THETA) coordinates of the visible sphere from the (X, Y) coordinates.

3. Call the map function to determine the (r, theta) coordinates of the input image produced by the preferred embodiment of the present invention.

4. Convert the (r, theta) coordinates to the (x, y) coordinates of the buffer storing the input image.

5. Color the output image the same color as the (x,y) coordinates of the said input image; and.

Figure 4:
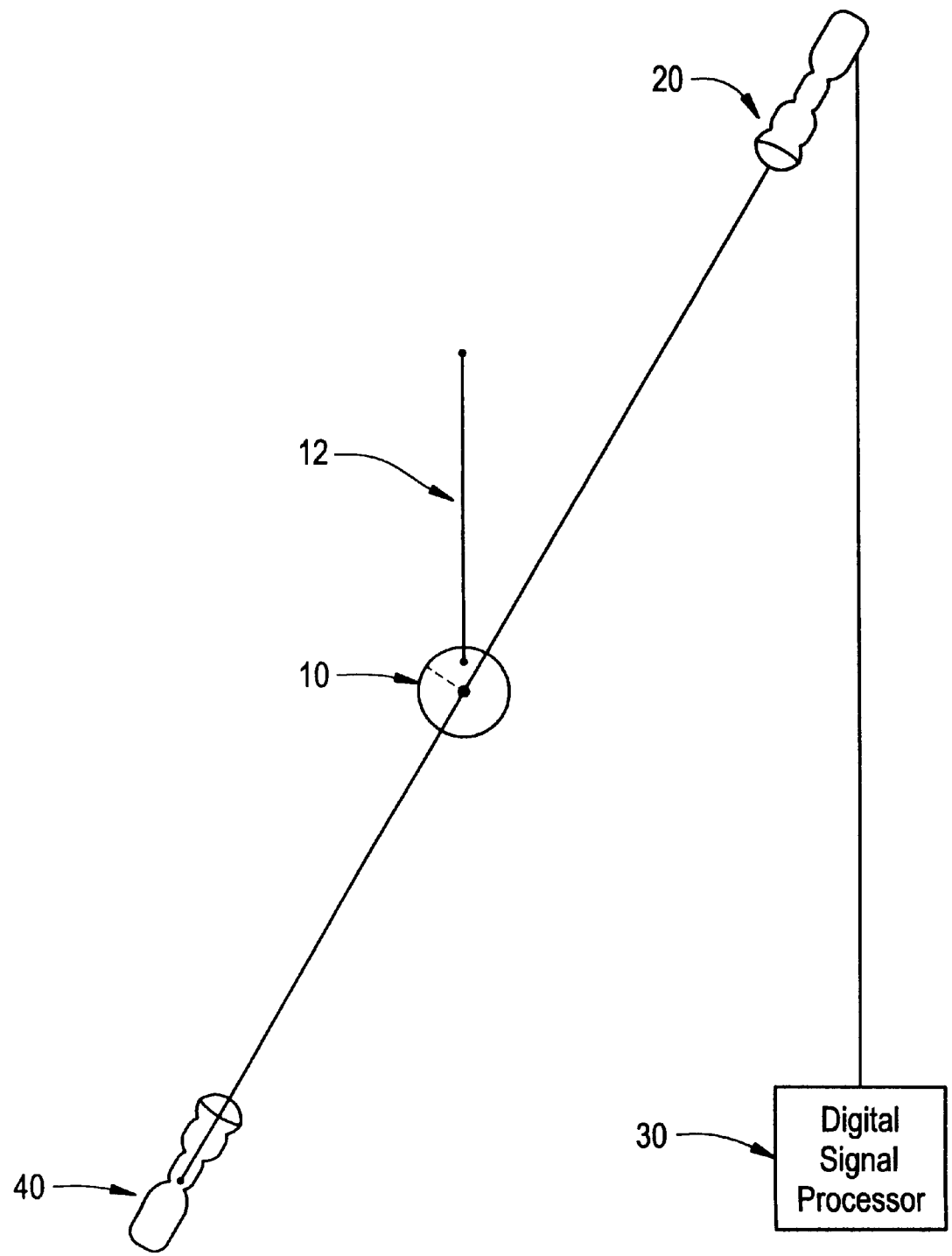
FIG. 4 is a second preferred embodiment according to the present invention.
Figure 6:
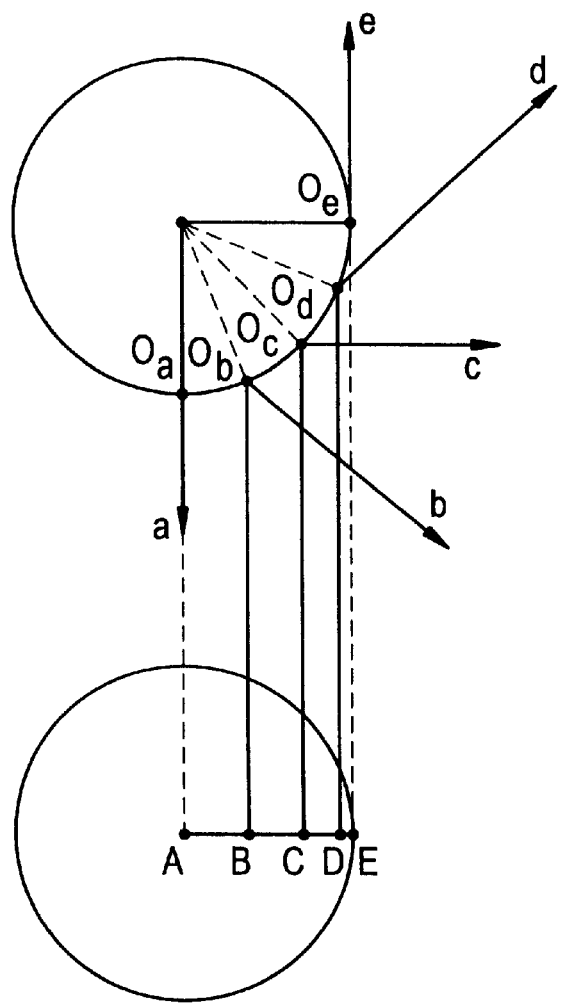

6. Repeat steps 1 through 5 until all points in the output image space have been visited FIG. 4 illustrates an alternative preferred embodiment according to the present invention, wherein the an additional camera 40 is advantageously positioned, in an exemplary case, opposite the camera 20. It will be noted that the output of camera 40 advantageously is input to DSP 30.

It should be noted that the addition of cameras, i.e., camera 40, allows a greater resolution of the resultant spherical data set and eliminates the problem of missing some fraction of the data in the spherical data set due to less than a full hemisphere being visible from a single camera. The addition of one camera in the proximity of the opposite side of the spherical mirror solves the "less than full hemisphere problem" (see FIG. 2), while additional cameras increase the resolution of the resultant spherical data set. It will be appreciated that additional cameras add a second layer of viewpoint smearing distortion. Sufficient distance of the cameras 20, 40 from the spherical mirror 10 coupled with suitable high-powered long lenses minimizes these distortions.

It will be appreciated that the mirror 10 advantageously can be moved to various locations, so long as all locations are within the line of sight of, for example, camera 20. It will also be appreciated that a plurality of spherical mirrors can advantageously be place throughout, in an exemplary case, a sports arena, so that several spherical data sets with different view points can be generated.

It will be appreciated that the apparatuses illustrated in FIGS. 3 and 4, suffer from the fact that the spherical mirror is fixed. Thus, no camera motion through the scenery is possible. One way to overcome this limitation is to collocate the spherical mirror and the camera in an unitary structure, while adding lenses and mirrors to fill in the weak parts of the image and to fill in the area where the camera is reflected in the sphere. This will be a larger area than in the apparatuses illustrated in FIGS. 3 and 4, above, because to attach the sphere to the camera requires a closer proximity of the two parts than the above apparatuses.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. An apparatus for generating spherical data sets, comprising:

a spherical mirror disposed at predetermined view point;

a camera including a long lens, focused on said spherical mirror, which camera generates an image data stream; and a processor, which receives said image data stream, and which generates the spherical data sets responsive to said image data stream.

2. The apparatus as recited in claim 1, wherein said camera comprises first and second cameras generating respective first and second image data streams; and said processor generates the spherical data set responsive to said first and second image data streams.

3. The apparatus as recited in claim 1, wherein said spherical mirror, said camera, and said processor define a unitary structure.

4. A method of generating spherical data sets for a device having a spherical mirror disposed at a predetermined view point, a camera including a long lens, focused on the spherical mirror, which camera generates an image data stream, and a processor, which receives the image data stream, and which generates the spherical data sets responsive to the image data stream, said method comprising the steps of:

determining next (XY) rectangular (X,Y) coordinates of a point in the output image buffer;

determining (PSI, THETA) coordinates of the visible sphere from the (X, Y) coordinates;

calling a map function to determine (r, theta) coordinates of the input image;

converting the (r, theta) coordinates to the (x, y) coordinates of the buffer storing the input image;

coloring the output image the same color as the (x,y) coordinates of the input image; and repeating all previously recited steps until all points in the output image space have been visited.

* * * * *